Patented Dec. 15, 1942

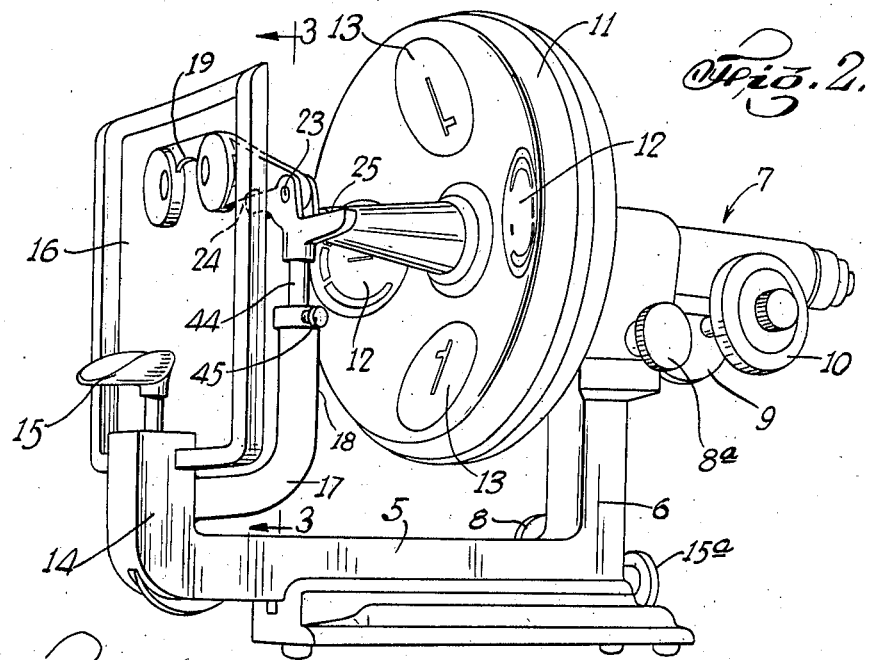

2,305,322

UNITED STATES PATENT OFFICE 2,305,322

CORNEAL MEASUREMENT

Elmer Le Roy Ryer, Hawthorne, and Elmer E. Hotaling, New York, N. Y.

Application October 18, 1939, Serial No. 299,948

12 Claims. (Cl. 88—22)

The invention herein disclosed relates to a method and instrument by which there is provided an objective means of determining and verifying the correction necessary to render an eye normal.

One of the most important determinations made by the optometrist in measuring eyes is the determination of the axis of, and the proper correction for, an eye having corneal astigmia. For many years the ophthalmometer has been employed primarily for locating the meridian of highest and the meridian of lowest curvature of the anterior surface of the eye and for measuring the difference in curvature at these meridians. This difference in curvature represents the corneal astigmia of the eye measured. When properly constructed, adjusted and used, the ophthalmometer is considered to provide an accurate determination of the factors. However, in order to prescribe the proper corrective cylinder, to render the vision from an astigmic eye normal, the determinations made with the ophthalmometer must be modified because among other reasons the corrective lens cannot be worn against the cornea. Several different formulae are in use for calculating from the ophthalmometer reading the corrective cylinder to be prescribed. All such formulae are empirical; they have been found in practice to provide a correction which in the majority of cases proves fairly satisfactory on subjective test.

Prior to the invention herein disclosed, the only way the optometrist could ascertain, in the first instance, the necessary correction was by use of the ophthalmometer and calculation by some empirical formula or by some less satisfactory method. To verify the prescription determined upon, it was necessary to apply the corrective lens to the patient and make subjective tests. Such subjective tests were likewise the only way in which the optometrist could determine whether a lens then being worn by a patient was satisfactory. Subjective tests, depending as they do upon the patient's reactions, are not always as well suited to the purpose as are objective tests in which the reactions of the patient are not relied upon.

It is an object of the invention herein disclosed to provide a method and instrument by which the proper corrective cylinder may be determined and by which the prescribed correction lens may be verified insofar as the cylindrical component of the lens is concerned. Essentially, the method comprises measuring the cornea of the eye through a lens. A cylindrical lens, preferably a minus cylinder, is placed before the patient's eye in the position, or approximately the position in which the lens will be worn by the patient. This cylindrical lens is placed before the eye with its axis reversed ninety degrees with respect to the axis of the cylindrical component of the lens to be worn by the eye being examined and then the cornea of the eye is measured through the lens with the ophthalmometer. If the cylinder placed before the eye be the proper correction for the particular eye, then the ophthalmometer will show the condition to be that of the normal eye. Preferably, though not necessarily, in carrying out the method, if there be required a spherical correction as well as a cylindrical correction for the eye under examination, the cylindrical and spherical lenses or a compound lens is placed before the eye and the cornea of the eye then measured through the lens or lenses with the ophthalmometer.

It is a well established fact that in an eye totally free from astigmia, the ophthalmometer will show about a half-diopter of corneal astigmia with-the-rule or, conversely, when the ophthalmometer shows about a half-diopeter higher corneal curvature in the vertical than in the horizontal meridian of an eye (representing a half-diopter with-the-rule astigmia, which is offset by an equal but opposite amount of so-called physiologic astigmia) that eye is probably one free from astigmia. Certain optometrists recognize three degrees of physiologic astigmia associated with three age groups. These are one-quarter diopter with-the-rule astigmia for patients up to thirty years of age; one-half diopter with-the-rule astigmia for ages between thirty and sixty years; and three-quarters diopter, with-the-rule astigmia above sixty years. In other words the normal eye of persons below thirty years of age shows one-quarter diopter of physiologic astigmia, of persons between thirty and sixty years one-half diopter, and of persons above sixty years three-quarters diopter. In accordance with the method of this invention, the cornea of the eye may be measured in the usual way with the ophthalmometer and the necessary calculations made to determine the corrective cylinder required. A minus cylinder of the requisite power is then taken from the trial case and placed before the patient's eye in the position with its axis at right angles to that in which it will be worn by the patient. The cornea of the eye is then again measured with the ophthalmometer through the lens. If, now, the ophthalmometer shows one-quarter diopter, one-half diopter or three-quarters diopter of corneal, with-the-rule astigmia expected in the normal eye in the respective age group of the patient, the prescription is correct as the cylinder has corrected the existing corneal astigmia to that degree found in the normal eye. The same verification may be made with a plus cylinder of a power and axis similar to the proposed correction lens used as described above. The minus cylinder is to be preferred, however, as it may be placed a little further from the cornea without disturbing the practical effects because lenses as worn have a tendency to slip down on the nose and away from the eyes.

In such a vertification of a prescription, for example, if the cylinder about to be prescribed is —2.00 D. C. axis 180, it may be verified with a —2.00 D. C. axis 90 lens. The lens is placed about fourteen millimeters from the eye, and the cornea is measured through the lens. If the condition of the normal eye is now recorded on the ophthalmometer, i. e. the quarter, half or three-quarter diopter residual, with-the-rule astigmia, as the case may be, the prescription is correct.

Obviously, the location of the axis and the amount of the astigmia and the necessary correction may be determined or estimated in the first instance without the use of the ophthalmometer. When this is done, the estimated corrective lens is placed before the patient's eye and the eye measured through the ophthalmometer. If the residual astigmia now indicated by the ophthalmometer is greater than the normal, it is evident that the correction is insufficient. Likewise, if the residual astigmia now indicated by the ophthalmometer is less than the normal, the correction is too great. By thus placing different cylindrical lenses before the eye, and measuring the eye with the ophthalmometer through the lenses successively, reducing or increasing the power of the lens as the case may require, the proper corrective cylinder may be determined in the first instance with the ophthalmometer.

In making measurements to verify the accuracy of the corrective cylinder prescribed, it is not absolutely necessary to utilize the required spherical component of the lens to be prescribed in any case, and if the spherical component is to be not more than plus or minus two diopters it is not at all necessary to use the spherical component. If, on the other hand, the spherical component is to be greater than plus or minus two diopters, it conduces to finer verification to combine the spherical with the cylindrical component when verifying measurements are made through the lens as above described. This is because a spherical component calls for a decrease in a minus cylinder correction in proportion to the plus spherical component and for an increase in proportion to the minus spherical component.

The verification test of the method of this invention is particularly suitable to the case of oblique astigmia. The correction for oblique astigmia is difficult to calculate by any rule or table. But, regardless of the power or obliquity of axis, if the proper corrective lens in both axis and power be prescribed, the normal, residual astigmia (i. e. half diopter, meridians 90 and 180 with-the-rule) will be indicated on the ophthalmometer upon verification, and if the prescribed lens be not correct, the normal, residual astigmia will not be indicated, that is, either the amount will be more or less and the two principal meridians will still be oblique or both conditions may obtain.

In the drawing there is illustrated an instrument forming a part of this invention and that is especially adapted for carrying out the method of this invention.

In the drawing:

Fig. 1 is a diagrammatic illustration of an instrument for measuring the curvature of the surface of an eye with projected light rays;

Fig. 2 is a perspective view of an instrument embodying this invention;

Fig. 3 is a sectional elevation taken on the line 3—3 of Fig. 2; and

Fig. 4 is a fragmentary elevation of a portion of the instrument.

The instrument illustrated in the drawing is primarily an instrument for measuring the curvature of the anterior surface of the cornea of the eye. This is effected by projecting light rays, at an angle, on to the surface of the eye and rotating the light rays about the optical axis of the eye. Commonly the projected light rays sharply define images of the mires. The miral images reflected from the surface of the eye are observed through an optical observation piece and aligned in one principal meridian. The light rays are rotated about the axis of the eye and realigned in the second principal meridian, if necessary. If there be no change in the curvature of the eye, the miral images reflected from the surface of the eye will remain in the located position during the complete revolution of the light rays. A change in curvature in the surface of the eye shifts the position of the reflected miral images or rather the direction of the reflected light rays and so the position of the reflected miral images. The amount the reflected miral images are thus shifted is of course proportional to the change in curvature.

In Fig. 1, there is represented diagrammatically the conditions that exist in measuring an eye. The head of the patient is positioned with the eye 1, in a fixed, definite relation with respect to the instrument. The light rays are projected from mire boxes 2 secured and enclosed upon a disk 3 rotatably mounted about a telescope 4. The reflected mires are observed through the telescope and the disk 3 carrying the mire boxes is rotated about the axis of the telescope to cause the projected mires to travel around the surface of the eye.

All of the foregoing is common and well known in the art. These are, essentially, the fundamentals of the ophthalmometer which is, and has been for some time, in general use for determining the presence of, the axis of and the extent of corneal astigmia. Primarily, this instrument is one for measuring the curvature of the corneal surface of the eye by projected light rays, projected in such a direction as to be reflected from the surface of the cornea.

These features are incorporated in the instrument illustrated in Figs. 2 and 3. In this instrument there is a base 5 upon which all parts of the instrument are mounted. Adjacent one end of the base, the right hand end as seen in Fig. 2, there is a standard 6 extending from the base. A telescope 7 is adjustably mounted upon the standard so that it may be raised and lowered through a finger wheel 8. The elevation of the axis of the telescope may thus be varied, within limits, and it may be fixed in any particular position. The usual focusing wheel adjustment 8a is provided for the telescope and wheels 9 and 10 for finding the radius of curvature in millimeters and for determining astigmia respectively.

Surrounding the telescope and rotatably mounted thereon, there is a housing 11. Two pairs of mire boxes 12 and 13 are mounted within the housing, adjacent the periphery thereof. The mire boxes are displaced in the housing angularly through ninety degrees. Each of these mire boxes contains a light source (not shown) within the housing and a figure or mire through which the light is projected. The projected light rays are caused to sharply define the images of the mires.

At the other end of the base, the left hand end as seen in Fig. 2, there is another standard 14 extending from the base. This standard supports a chin rest 15 and a head rest 16 mounted on the upper end of the standard. A bracket 17 is mounted upon and extends at right angles from the standard. This bracket has a hollow end portion 18 and supports a trial lens frame 19. The elevation of the chin rest may be adjusted through a hand wheel 15a.

The trial lens frame is provided with an arm 20 extending from one side thereof and which has an arcuate projection 21. This arcuate projection 21 is received within an arcuate slot in a bracket 22 and pivotally secured therein by a pivot 23. The bracket 22 has two oppositely extending flats 24 and 25 at different elevations, one of which, the flat 24 engages one edge of the arm 20 to support and properly position the trial frame in front of the head rest and the eyes of the patient. The other flat 25 engages the opposite edge of the trial frame and supports the trial frame in a position clear of the head rest, the trial frame being swung about its pivoted connection with bracket 22 from one position to the other.

The particular trial frame illustrated comprises two circular cases 26 and 27 separated and relatively positioned by a nose bridge 28 secured to the cases. In each case, there is an opening through the case near the adjacent edge of the other case. Thus, the case 26 has an opening 29 therethrough and the case 27 has an opening 30 therethrough. Each case also has an opening through the front cover such as the openings 31 in the case 26 through which indicia indicating the power of the lens at the opening through the case is indicated.

Within each case there are one or more disks or disk sectors such as the disks 32 and 33 illustrated in Fig. 4. The disk 32 carries a series of angularly spaced lenses 34 of different powers rotatably mounted in the disk and at one point a slot 35. Similarly, the disk 33 carries a series of angularly spaced lenses 36 of different powers rotatably mounted in the disk and at one point a slot or slit 37. The lenses 34 and 36 are cylindrical lenses. The disk 32 is rotatably mounted in the case 26 in position such that the several lenses 34 or the slit 35 may be brought into position at the opening 29. The frame around each cylindrical lens 34 has formed thereon peripheral gear teeth 38. The teeth 38 on the several frames mesh with a gear 39 rotatably mounted within the case centrally of the disk 32. A knob 40, having angular indications thereon readable against a fixed indicator mark 41 on the case, is provided for manually rotating the gear 39. In this way the cylindrical lens at the opening may be rotated to shift the axis thereof as desired. A similar arrangement is provided for rotating the lenses 36 in the disk 33. The openings 29 and 30 should be of sufficient size and the lenses of sufficient aperture to pass all of the light rays emanating from the mire boxes.

An additional disk having spherical lenses of different powers may also be mounted in the case 26 so that a compound lens, of any desirable characteristic may be positioned before the opening 29. The disk 32 is rotated in the case by a finger wheel 42 through gears (not shown) in a manner well known in the art. In like manner the disk 33 and any additional disk carrying spherical lenses is mounted in the case 27 and rotated through a finger wheel 43.

The bracket 22 upon which the trial frame is mounted is provided with a post 44 that is received in the hollow end 18 of the bracket 17. The post 44 is slidable mounted in the bracket so that the trial frame may be adjusted vertically to suit different patients. A set screw 45 locks the bracket in the adjusted vertical position. The trial frame is mounted so as to be angled or tilted with respect to the vertical. In this way interfering specular reflection from the correcting lens surface is avoided.

In examining eyes for the purpose of prescribing corrective lenses, the instrument is placed upon a table. The patient is seated at one end of the table at a height such that his chin rests comfortably on the chin rest 15 with his head in the head rest 16. The trial frame is positioned before the head rest and adjusted to the elevation of the patient's eyes. Next the disks 32 and 33 are rotated to bring the slits 35 and 37 into position before the patient's eyes. The trial frame support is constructed so that these slits are in line when brought before the patient's eyes and horizontal and properly related to the telescope. The patient is then told to shift his head until he sees the two slots as but one slot. When this condition exists the eyes are in proper relation to the instrument for examination. One eye is examined at a time, the shield being placed before the eye not under examination. The telescope is then adjusted so that the patient looks directly into the telescope.

When these adjustments are made the examining optometrist may, if he desires, swing the trial frame to a position away from the eyes and proceed to make his examination in the usual way. Or he may leave the trial frame in position and rotate the disk of the particular case before the eye to be examined until there is no lens before that eye and rotate the other disk to bring a shield before the other eye. He may then examine the eye in the usual way. After he has examined the eye and made his determination, he rotates the disk in the trial frame carrying the cylindrical lenses to bring before the eye the cylindrical lens that his determinations indicate should be prescribed. With this lens before the eye and with its axis rotated ninety degrees with respect to the axis of the lens to be worn, the eye is again examined through the lens. This examination indicates the effective curvature of the cornea of the eye as affected by the refraction of the light passing to the eye through the lens. If his initial determination be correct, he will find the condition to be that of the normal eye. If his determination be wrong he will not find this condition and he may either reexamine the eye as he did in the first instance or change the power of the cylindrical lens before the eye, by rotating the disk in the trial frame to secure a lens of greater or lesser power as the case may require, and then again examine the eye through the new lens. This latter procedure may be continued, if necessary, until the proper lens and axis is found.

Since but one eye is examined at a time, the trial lens frame 19 may be replaced with a single lens case instead of the two lens cases of the trial lens frame illustrated. Such a single case would, of course, be mounted so that it may be positioned before either eye.

From the foregoing description of the method and instrument for examining eyes it will be apparent that by this invention there is provided a more accurate and more adaptable manner of determining and verifying the corrective lens necessary to render an astigmic eye as effective as a normal eye insofar as the production of retinal images is concerned.

It will be obvious that various changes may be made by those skilled in the art in the details of the steps of the method described above and in the details of the instrument disclosed in the drawing within the principle and scope of the invention as expressed in the appended claims.

We claim:

1. In an instrument of the type described, the combination comprising a base, means on the base adjacent one end thereof for measuring the curvature of the surface of an eye including a telescope for observing the eye, a head rest mounted upon the base adjacent the other end thereof, and a lens frame having a nose bridge and a lens opening on each side of said bridge, said lens frame being pivotally mounted on the base and movable in a sidewise direction from a position between the head rest and the telescope and adjacent the head rest to a position removed from between the telescope and the head rest and stop means for limiting said movements from each of said positions.

2. In an instrument of the type described, the combination comprising a base, means on the base for measuring the curvature of an eye including a telescope for observing the eye, and means arranged in a fixed relation with respect to the telescope for positioning the eyes of a patient with respect to the telescope including an opaque shield having minute openings therethrough arranged to come before the eyes of the patient.

3. The method of ascertaining the cylindrical correction for an eye under examination, which method includes producing reflections of ophthalmometer mires on the anterior surface of the cornea of the eye to be examined, rotating said mires about the optical axis of said corneal surface, observing said reflections through the telescope of the ophthalmometer and determining by adjustment of the focus of the ophthalmometer the variation in radius of curvature of said corneal surface and the axis of minimum curvature, placing in front of the eye a lens of the determined cylindrical correction including the variation in radius of curvature previously determined and with the axis of the cylinder at right angles to that in which it is to be worn by the patient, said lens otherwise occupying substantially the position in which the prescribed lens will be worn, and checking the accuracy of the lens by observing through the lens the related positions of reflections of ophthalmometric mires on the anterior surface of the cornea of the eye.

4. In an ophthalmometer for ascertaining the cylindrical correction for an eye under examination comprising a base constituting a support having spaced uprights thereon, one of said uprights having head positioning means carried thereby and the other having a telescope mounted thereon for rotation about a longitudinal axis passing substantially through the eye to be examined when aligned therewith, mires carried by said telescope for rotation therewith to the angular positions selected for the test, said telescope being adapted for use in viewing reflections of said mires on the anterior surface of the cornea of the eye, the telescope having focusing adjustments determining in scale units the radius of curvature of the cornea as indicated by the relating of the reflections of the mires and a frame carried by said base comprising a pair of spaced lens cells, means for supporting said lens cells in spaced relation with each other on said base between the head positioning means and the telescope and cylindrical test lens means in each of said cells located substantially in the position in which the prescribed lens will be worn before the eye.

5. In an ophthalmometer for ascertaining the cylindrical correction for an eye under examination comprising a base constituting a support having spaced uprights thereon, one of said uprights having head positioning means carried thereby and the other having a telescope mounted thereon for rotation about a longitudinal axis passing substantially through the eye to be examined when aligned therewith, mires carried by said telescope for rotation therewith to the angular positions selected for the test, said telescope being adapted for use in viewing reflections of said mires on the anterior surface of the cornea of the eye, the telescope having focusing adjustments determining in scale units the radius of curvature of the cornea as indicated by the relating of the reflections of the mires and a frame pivotally carried by said base comprising a pair of spaced lens cells, means for supporting said lens cells in spaced relation with each other on said base between the head positioning means and the telescope, cylindrical test lens means in each of said cells located substantially in the position in which the prescribed lens will be worn before the eye, said frame, including the spaced lens cells, being movable as a unit about the pivot into and out of position of use before the eyes and stop means for limiting said movements.

6. In an ophthalmometer for ascertaining the cylindrical correction for an eye under examination comprising a base constituting a support having spaced uprights thereon, one of said uprights having head positioning means carried thereby and the other having housing means mounted thereon for rotation about a longitudinal axis passing substantially through the eye to be examined when aligned therewith, mires carried by said housing means for rotation therewith to the angular positions selected for the test, a telescope in said housing for viewing reflections of said mires on the anterior surface of the cornea of the eye, the telescope having focusing adjustments determining in scale units the radius of curvature of the cornea as indicated by the relating of the reflections of the mires and a frame carried by said base comprising a pair of spaced lens cells, means for supporting said lens cells in spaced relation with each other on said base between the head positioning means and the telescope and rotatable means having a plurality of cylindrical test lenses of graded powers in each of said cells with each of said lenses, when aligned with the eye, being located substantially in the position in which the prescribed lens will be worn before the eye.

7. In an ophthalmometer for ascertaining the cylindrical correction for an eye under examination comprising a base constituting a support having spaced uprights thereon, one of said uprights having head positioning means carried thereby and the other having housing means mounted thereon for rotation about a longitudinal axis passing substantially through the eye to be examined when aligned therewith, mires carried by said housing, means for rotation therewith to the angular positions selected for the test, a telescope in said housing for viewing reflections of said mires on the anterior surface of the cornea of the eye, the telescope having focusing adjustments determining in scale units the radius of curvature of the cornea as indicated by the relating of the reflections of the mires and a frame pivotally carried by said base comprising a pair of spaced lens cells, means for supporting said lens cells in spaced relation with each other on said base between the head positioning means and the telescope, rotatable means having a plurality of cylindrical test lenses of graded powers in each of said cells with each of said lenses, when aligned with the eye, being located substantially in the position in which the prescribed lens will be worn before the eye, said frame, including the spaced lens cells, being movable as a unit about the pivot into and out of position of use before the eyes and stop means for limiting said movements.

8. The method of ascertaining the cylindrical correction of an eye of an individual comprising placing a cylindrical lens of estimated required power at the normal position of use before the eye with its axis substantially at right angles with respect to an estimated axial position at which the final corrective lens is to be worn before said eye, projecting light rays and producing reflections of ophthalmometer mires on the anterior surface of the cornea of the eye to be viewed through said cylindrical lens of estimated power and adjusting and relating the position of the reflected mires while observing said reflected mires through the telescope of the ophthalmometer to determine the accuracy of said cylindrical lens of estimated power according to the relating of said mires.

9. The method of ascertaining the cylindrical correction of an eye of an individual having corneal astigmia other than the inherent normal corneal astigmia comprising placing a cylindrical lens of known power at the required position of use before the eye with its axis substantially at right angles with respect to an estimated axial position at which the final corrective lens is to be worn before said eye, projecting light rays and producing reflections of ophthalmometer mires on the anterior surface of the cornea of the eye to be viewed through said selected lens and adjusting and relating the position of the reflected mires while observing said reflected mires through the telescope of the ophthalmometer to determine the accuracy of the cylindrical lens of known power according to its ability to correct substantially all but the inherent corneal astigmia of the eye.

10. The method of ascertaining the cylindrical correction of an eye of an individual having corneal astigmia other than the inherent normal corneal astigmia comprising placing a cylindrical lens of known power at the required position of use before the eye with its axis substantially at right angles with respect to an estimated axial position at which the final corrective lens is to be worn before said eye, projecting light rays and producing reflections of ophthalmometer mires on the anterior surface of the cornea of the eye to be viewed through said selected lens and adjusting and relating the position of the reflected mires while observing said reflected mires through the telescope of the ophthalmometer to determine the accuracy of the cylindrical lens of known power according to its ability to correct substantially all but the inherent corneal astigmia of the eye and, if necessary during said test, altering the axis of said cylindrical lens of known power an amount sufficient to compensate for any off axis position of said inherent corneal astigmia from its normal axial position.

11. The method of ascertaining the cylindrical correction of an eye of an individual having corneal astigmia other than the inherent normal corneal astigmia, comprising placing a cylindrical lens of known power at the required position of use before the eye with its axis substantially at right angles with respect to an estimated axial position at which the final corrective lens is to be worn before said eye, projecting light rays through said selected lens and producing reflections of ophthalmometer mires on the anterior surface of the cornea of the eye, adjusting and relating the position of the reflected mires while observing said reflected mires through the telescope of the ophthalmometer to determine if there is an indicated corneal astigmia different from the inherent normal corneal astigmia of said eye and, if necessary, altering the power of the said cylindrical lens according to any indicated difference of said existing corneal astigmia from that of the inherent normal corneal astigmia.

12. The method of ascertaining the cylindrical correction of an eye of an individual having corneal astigmia other than the inherent normal corneal astigmia, comprising placing a cylindrical lens of known power at the required position of use before the eye with its axis substantially at right angles with respect to an estimated axial position at which the final corrective lens is to be worn before said eye, projecting light rays through said selected lens and producing reflections of ophthalmometer mires on the anterior surface of the cornea of the eye, adjusting and relating the position of the reflected mires while observing said reflected mires through the telescope of the ophthalmometer to determine if there is an indicated corneal astigmia different from the inherent normal corneal astigmia of said eye and, if necessary, altering the power of the said cylindrical lens according to any indicated difference of said existing corneal astigmia from that of the inherent normal corneal astigmia and, if necessary, altering the axis of said cylindrical lens according to the departure of the axis of said inherent normal corneal astigmia from its normal axial position.

ELMER LE ROY RYER.
ELMER E. HOTALING.